Oct. 16, 1962 SOJIRO ISHIZUKA ETAL 3,058,159
METHOD FOR PRODUCING A PEARL-FORMED
SOLID-STATE CONDENSATION-TYPE RESIN
Filed Dec. 29, 1959
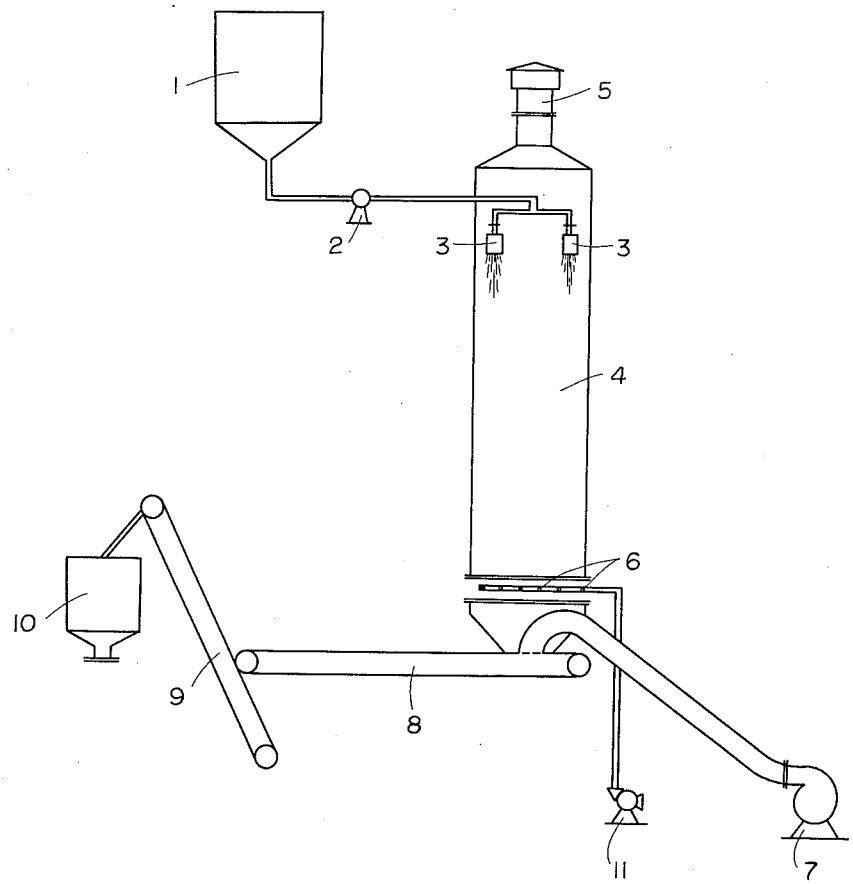
SOJIRO ISHIZUKA
KENICHI SATO
    INVENTORS
BY  *n. L. Leak*
    ATTORNEY

3,058,159
METHOD FOR PRODUCING A PEARL-FORMED SOLID-STATE CONDENSATION-TYPE RESIN

Sojiro Ishizuka and Kenichi Sato, Hyogo-ken, Japan, assignors to Japan Reichhold Chemicals, Inc., Tokyo, Japan, a corporation of Japan
Filed Dec. 29, 1959, Ser. No. 862,603
Claims priority, application Japan Dec. 29, 1958
1 Claim. (Cl. 18—47.2)

This invention relates to a method of manufacturing a novel form of a solid-state condensation-type resin. More particularly, the invention relates to a novel solid-state condensation-type resin having a pearl-like shape, i.e., a spherical or granular form.

Another object of the invention is to provide a method of manufacturing a pearl-formed solid-state condensation-type resin, which because of the nature of the apparatus required does not require a large area for its manufacture as in the case of the conventional methods and also which is capable of eliminating the large amount of labor required for grinding.

A still another object of the invention is to provide an improved method of manufacturing a pearl-formed solid-state condensation-type resin whose shape and particle size are very uniform.

Further objects and advantages will become apparent from the description to be given hereinafter.

Heretofore, there have been known those polymerization-type resins manufactured by the pearl polymerization method such as polystyrene or polymethacrylate whose resin particle diameter is from 0.1 to 15 mm. and whose particles are pearl-like in shape.

However, the aforesaid pearl polymerization is that in which the polymerization is performed in the suspension state, and thus this method of polymerization cannot be applied to the manufacture of solid-state condensation-type resins such as, for example, phenolic resins, maleic resins, fumaric resins, pentaerythritol resins, and those of these resins which have been modified by a natural resin such as rosin; or urea resins and epoxy resins.

Hence, inasmuch as the solid-state condensation-type resins such as mentioned above were generally those in which the fused resin after completion of the resin-forming reaction were cooled by being left standing after pouring into a cooling pan to increase their surface area and the thus obtained lumpy-formed resins were mostly pulverized by manual or mechanical means to make the finished product, the shape of the commercially available products were in all cases of block, powder, or flake form, and those in the pearl form as seen in the polymerization-type resin such as the aforesaid polystyrene and polymethacrylate did not exist.

On the other hand, this invention relates to a solid-state condensation-type resin having a novel shape wherein the individual resin particles are from 0.5 to 15 mm. in diameter, preferably within the range of 0.5 to 10 mm., and moreover the shape of which are pearl-like. This type of solid-state condensation-type resin has as compared with those of the conventional block, powder, or flake form various advantages as enumerated below:

(a) *Reaction velocity.*—Since it is in pearl form, its surface area per unit weight becomes far greater than that of the conventional block, powder, or flake form. Hence, when this type of resin is reacted further with other solid, liquid, or gaseous substances, since its contact area becomes great, its reaction velocity becomes great, and therefore it is very convenient in case when these are used as intermediates in the production of other products.

(b) *Uniformity of size and shape.*—While it is necessary that the size as well as the shape of each of the individual resin particles be the same, in case of those of the conventional block, powder, or flake form, it was almost impossible to render identical the shape of the individual particles. On the other hand, in this invention not only can the individual resin particles be made substantially identical in their shape, but also their size can be made much more uniform than the conventional ones, for example, by means such as sieving. Therefore those of pearl form can be mixed to much greater uniformity than the conventional product.

(c) *Solubility.*—Since the surface area per unit weight of that of the pearl form becomes greater than that of the conventional ones in the form of solid, powder, or flake, the solubility increases as compared with the conventional resins.

(d) *Fluidity.*—With the fluidity increased when compared with those conventional ones in the form of block, powder, or flake on account of all of the particles being of pearl shape, it becomes easy to render the operation continuous and makes for convenience in handling.

(e) When compared with the conventional products in the form of powder or flake the hygroscopicity, stickiness, dustiness, tendency to scatter, danger of explosion, etc. are all decreased.

The advantages that will be had on account of the particle size of the resin will vary somewhat depending on the use to which the resin is applied, however, it is desirable that each resin particle be within the range of 0.1 to 15 mm. in diameter. This is because when the diameter of each of the resin particles becomes less than 0.1 mm., the resin takes on the defects possessed by the conventional powder or flake form resin and its hygroscopicity, stickiness, dustiness, danger of explosion, etc. appear, while when the diameter becomes larger than 15 mm., its solubility, reactivity, etc. decrease. When considered from these points such as the hygroscopicity, dustiness, tendency to scatter, danger of explosion, reactivity, etc., the size of the resin particle preferably has a diameter of from 0.5 to 10 mm.

In accordance with this invention, the pearl-formed solid-state condensation-type resin is manufactured as follows:

When the pearl-formed solid-state condensation-type resin is produced in accordance with the normal method by the fusion method of production of resins, the resin after completion of the reaction, i.e., the reaction product, is passed through a jet assembly and jetted while in the fused state into a suitable cooling zone of such as air, nitrogen, carbon dioxide gas, etc. where the resin in fused state is cooled and solidified while falling through the cooling zone to form pearl-like, i.e. substantially spherical, resin particles.

When we made further researches into the method of manufacturing this solid-state condensation-type resin in the pearl form, we found that there existed a very close correlation between the viscosity of the fused resin, jet pressure, and diameter of the jet nozzle orifice at the time of pearl formation on one hand and the fineness and distribution of the pearl-formed resin particles that were obtained on the other.

Precisely, when manufacturing solid-state condensation-type resin by the fused method in accordance with this invention, by jetting and cooling after completion of the reaction a fused resin having at the time of jetting a fused viscosity of 50–5000 cp. through numerous jet nozzle orifices whose diameters are from 0.5–3 mm. at a pressure of 2–25 kg./cm.$^2$, it is possible to obtain a still greater uniformity as to their shape and fineness in the pearl-formed solid-state condensation-type resins with respect to all of their products.

On the other hand, if the conditions with respect to the fused resin when it is jetted from the jet nozzle orifices do not come within the above ranges of 50–5000 cp. for fused viscosity, 2–25 kg./cm.$^2$ for pressure, and 0.5–3 mm. for the diameter of the jet nozzle orifice, the resin obtained has difficulty in assuming a uniform-sized shape. Accordingly, normally the range of distribution of fineness become wide, and moreover there are contained within the product resin solids of varied shapes such as those which are board-like and strip-like. However, by regulating the fused viscosity, jet pressure, and the orifice diameter of the jet assembly within the above range, a solid-state condensation-type resin can be produced whose particle diameters fall within the range from 0.1–15 mm. and moreover in which the range of distribution of the resin particle fineness is narrow and further which are of uniform pearl-like shape. In this case, if the polymerization degree of the resin is high after completion of its reaction, and in consequence the fused viscosity approaches relatively the upper limits even though within the aforesaid range, i.e., close to 5000 cp., it is desirable that the jet pressure be regulated within the above range so as to be correspondingly high, while if on the other hand the viscosity is relatively low even though within the aforesaid range, the jet pressure is preferably regulated as to be low.

The pearl-formed resin particles which have been jetted and have fallen through the cooling zone may, for example, be easily collected in a container for removal by providing at the bottom of the cooling zone a suitable hopper, conveyor, or other means.

As the jet assembly which may be used in this invention, there are, for example, the fixed type and the rotary-disk type. While the former type is that in which the jetting is accomplished by jetting the resin through orifices and the latter that in which the resin issues from between the clearance formed by a fixed and a rotary disk, in this invention, for convenience sake, both will be referred to as jet nozzles.

While, in general, the temperature of the cooling zone is preferably room temperature or less, in case there is a need to regulate the cooling rate of the resin in fused state, the temperature may be suitably determined according to the cooling conditions desired, it being possible to let the resin fall through a heated atmosphere first and then passing it through a low temperature cooling zone of less than room temperature, etc.

In this invention, generally it is advantageous to carry out the cooling by blowing upwards from the bottom of the particle-forming tower a cooling fluid such as a cold wind or a jetted spray of cooling water passing in countercurrent relation to the spray of resin jetted from the jet nozzle orifices. In this instance, while as the cold wind, air is generally most suitable from the standpoint of economy, depending upon the properties of the resin and cooling conditions, a suitable gas such as nitrogen, carbon dioxide etc. may be used.

Next, while referring to the accompanying drawing, an embodiment for practicing the invention will be described. It is to be understood however that the accompanying drawing merely illustrates one example of an apparatus for practicing the method of the invention.

First, the starting materials, for example, rosin, maleic anhydride, glycerine, etc. which have been charged into the reactor 1 are reacted under an atmosphere of carbon dioxide gas and resinified. After the resinification reaction has been completed, the reactant product, i.e., the resin, is, while maintaining its fused state, either fed under pressure to a jet assembly 3 or is fed to the jet assembly 3 by a pump 2 and is jetted into a cooling chamber 4 of the particle-forming tower, from jet nozzle orifices provided in jet assembly 3, the diameter of the orifices being from 0.5–3 mm., preferably under a jet pressure of 2–25 kg./cm.$^2$ with a fused viscosity of 50–5000 cp. While the resin is being jetted, a spray of cooling water is blown up into the cooling chamber 4 from a cooling water jet 6 by means of a pump 11, and this water vapor is removed with an axial exhaust blower 5. Concurrently, air is fed by means of a blower 7, and the resin particles which have been cooled, solidified, and have become pearl-like are collected in a hopper 10 after passing through a forced draft conveyor 8 and a bucket conveyor 9.

As described hereinabove, in accordance with this invention, since it is possible to manufacture directly a solid-state condensation-type resin as resin particles having a novel pearl-like form by the use of narrow, vertically extending apparatus, the necessity for a large area and a large amount of labor can be eliminated.

Moreover, since the resin particles of the pearl-formed solid-state condensation-type resins manufactured in accordance with this invention has a spherical surface and thus its surface area per unit weight of the resin becomes great, when these resins are used as the starting material in the further manufacture of other products, there are various advantages such as the ease with which the reaction may be made to proceed, the possibility of uniformity in mixing, convenience in dissolving, possibility of effecting continuity of operation since it has fluidity, and as compared with the powdered form, lesser possibility of the occurrence of hygroscopicity, stickiness, dustiness, tendency to scattering, and the the danger of explosion.

The following examples illustrate the nature of the invention but is not intended to limit it in any manner except as it is limited in the appended claim.

*Example 1*

When manufacturing 4 kg. of Beckacite 1126 (a trade name of a product of Japan Reichhold Chemicals, Inc.), a phenolic resin modified by rosin, during its reaction when the melting point of the resin, 153° C., and its acid value of 14.5 were reached, heating was stopped, and immediately an inert gas was blown in from the top of the reactor to deliver under pressure the resin in fused state to a rapid rotary-disk type jet assembly located at a height of 4 m. This resin which was delivered under pressure was jetted from the rotary-disk jet nozzle into a particle-forming tower at room temperature using 5 seconds under the conditions of the distance between the rotary-disk and fixed disk of the rotary-disk type jet assembly being 3.4 mm., the revolution of the rotary-disk, 3570 r.p.m., and the circumferential speed of disk, 850 m./min. Thus the resin which fell to the bottom of the particle-forming tower and was cooled and solidified exhibited a pearl-like shape, and its fineness distribution was as follows.

| Particle size: | Distribution, percent |
|---|---|
| Less than 3 mm | 44 |
| 3–5 mm | 29 |
| 5–8 mm | 12 |
| 8–10 mm | 9 |
| Over 10 mm | 5 |

*Example 2*

When manufacturing 10 kg. of Beckacite 1111 (a trade name of a product of Japan Reichhold Chemicals, Inc.), a maleic resin modified by rosin, the reaction was stopped when the melting point of the resin, 116° C. and the acid value of 35.2 were reached, and in a similar manner as in Example 1, an inert gas was blown in to deliver the resin under a pressure of 0.2–0.5 kg./cm.$^2$ to a rapid rotary-disk type jet assembly located at a height of 4 m. This resin was then jetted using 12 seconds from the rotary-disk jet nozzle into a particle-forming tower at room temperature under jetting conditions of the distance between the rotary-disk and fixed disk of said assembly being 2 mm., the disk revolution, 4450 r.p.m., and the circumferential speed of disk, 1154 m./min. The jetted resin scattered and while falling to the bottom was cooled and solidified. The pearl-like product obtained had a fineness distribution as follows.

Particle size: Distribution, percent
- Less than 3 mm _____ 50
- 3–5 mm _____ 35
- 5–8 mm _____ 5
- 8–10 mm _____ 4
- Over 10 mm _____ 5

*Example 3*

10 kg. of Beckacite 1126 having a melting point of 155.4° C. and an acid value of 16.2, similar to that used in Example 1, after completion of its reaction and while in the fused state was delivered in a similar manner to the rotary-disk type jet assembly under a pressure of 0.2–0.8 kg./cm.$^2$. This resin, upon being jetted and solidified in a cooling chamber at room temperature using 12 seconds under the conditions of the distance between the rotary-disk and fixed disk of said assembly being 3.5 mm., the disk revolution, 4450 r.p.m., and the circumferential speed of disk, 1154 m./min., exhibited a pearl-like shape, and its fineness was as follows.

Particle size: Distribution, percent
- Less than 3 mm _____ 34
- 3–5 mm _____ 31
- 5–8 mm _____ 10
- 8–10 mm _____ 12
- Over 10 mm _____ 13

*Example 4*

In manufacturing 6 tons of Beckacite 1126, during its reaction when 152° C., the melting point of the resin, and 146.6, the acid value, were reached, heating was discontinued, and the resin in fused state was delivered by pumping up under a pressure of 21 kg./cm.$^2$ to jet assemblies having particle-forming jet nozzle orifices. These jet assemblies having jet nozzle orifices were disposed at a height 12 m. from the bottom of the particle-forming tower, two being installed, each having 250 jet orifices, the diameter of each orifice being 1 mm. The delivered resin reached a temperature of about 260° C. at the exit of the jet assemblies and was jetted into the cooling chamber of the particle-forming tower under a pressure of 16 kg./cm.$^2$, the fused viscosity at this time being 2000–2500 cp. Concurrently with the start of the above jetting, cold water delivered at a flux of 150 kg.–300 kg./hr. was sprayed into the cooling chamber from the cooling water jets under a pressure of 215 kg./cm.$^2$, and the resin was cooled, resulting in solidified pearl-like particles which accumulated at the bottom of the particle-forming tower. These pearl-like resins were then collected in a hopper after passing through a forced draft conveyor and a bucket conveyor.

Of the pearl-like resins that were formed those having particle size of diameters from 2.0±0.5 mm. totaled 80%, and the remainder were those whose diameters were from 1 mm. to 3 mm.

*Example 5*

In manufacturing 6 tons of Beckacite 1111, the reaction was discontinued when the melting point 118° C. and acid value of 36.1 of the resin were reached, and the resin in fused state was pumped up under a pressure of 5 kg./cm.$^2$ to 2 jet assemblies (200 jet orifices—orifice diameter 1 mm.) disposed at the same height as in Example 1. The delivered resin was jetted into a cooling chamber leaving the jet nozzle orifices at a temperature of about 260° C., a fused viscosity of 150–200 cp., and a pressure of 4 kg./cm.$^2$. The fused resin, which was jetted under conditions identical to Example 4, was cooled and solidified and became a pearl-like product. In the fineness distribution, 78% was occupied by those having particle diameters 1.5±0.5 mm., 21% by those from 2 mm. to 3 mm., and 1% were those which were like cotton and those which were like pieces of fibers. These products which resembled cotton and those resembling pieces of fibers were those which were formed as a result of delivering under pressure of an inert gas at a pressure of 2.5–3 kg./cm.$^2$ the small amount of resin that remained in the vessel at the last stage of jetting to the jet assemblies and jetting the same.

Since it is obvious that many changes and modifications can be made in the above described details without departing from the nature and spirit of the invention, it is to be understood that the invention is not to be limited to said details except as set forth in the appended claim.

What is claimed is:

A method of manufacturing a pearl-formed solid-state condensation type resin which comprises the steps of preparing a solid-state condensation type resin, thereafter immediately jetting the fused resin while still in a molten state and before being solidified by cooling through a plurality of jet nozzle orifices 0.5 to 3 mm. in diameter and under a pressure of 2–25 kg./cm.$^2$, said fused resin having a fused viscosity of 50–5000 cp., and immediately thereafter cooling the jetted resin with a cooling fluid whereby pearl-shaped resin particles having a diameter of from 0.1 to 15 mm. are formed.

References Cited in the file of this patent

UNITED STATES PATENTS

| | | |
|---|---|---|
| 1,217,115 | Bakeland | Feb. 20, 1917 |
| 1,798,166 | Mensing | Mar. 31, 1931 |
| 1,837,869 | Jewett et al. | Dec. 22, 1931 |
| 2,101,635 | Bender | Dec. 7, 1937 |
| 2,278,059 | Chambers et al. | Mar. 31, 1942 |
| 2,314,308 | Ellis | Mar. 16, 1943 |
| 2,652,386 | Wallman | Sept. 15, 1953 |
| 2,716,099 | Bradley | Aug. 23, 1955 |
| 2,797,201 | Veatch et al. | June 25, 1957 |
| 2,811,748 | Smith | Nov. 5, 1957 |
| 2,929,106 | Snow | Mar. 22, 1960 |
| 2,931,067 | Delaloye et al. | Apr. 5, 1960 |
| 2,975,483 | Cooper et al. | Mar. 21, 1961 |

FOREIGN PATENTS

| | | |
|---|---|---|
| 564,773 | Canada | Oct. 14, 1958 |